United States Patent [19]

Wallrabenstein et al.

[11] 4,208,509
[45] Jun. 17, 1980

[54] PROCESS FOR THE PREPARATION OF POLYTEREPHTHALOYL-AND POLYDIPHENYL ETHER-4,4-DICARBOXYLIC ACID OXALAMIDRAZONE

[75] Inventors: Michael Wallrabenstein, Worth am Main; Joachim Behnke; Walter Brodowski, both of Amorbach, all of Fed. Rep. of Germany

[73] Assignee: Akzona Incorporated, Asheville, N.C.

[21] Appl. No.: 871,135

[22] Filed: Jan. 20, 1978

[30] Foreign Application Priority Data

Jan. 26, 1978 [DE] Fed. Rep. of Germany ....... 2703072

[51] Int. Cl.$^2$ ...................... C08G 69/32; C08G 73/00
[52] U.S. Cl. ................. 528/207; 264/178 F; 264/205; 528/208; 528/336; 528/342
[58] Field of Search .............. 528/208, 207, 342, 336; 264/178 F, 205

[56] References Cited

U.S. PATENT DOCUMENTS

| | | | |
|---|---|---|---|
| 3,544,528 | 12/1970 | Magerlein et al. | 528/208 |
| 3,560,452 | 2/1971 | Schulze et al. | 528/208 |
| 3,560,453 | 2/1971 | Schopf et al. | 528/208 |
| 3,718,625 | 2/1973 | Wallrabenstein et al. | 528/342 |
| 3,876,586 | 4/1975 | Wallrabenstein et al. | 528/342 |

*Primary Examiner*—Lester L. Lee
*Attorney, Agent, or Firm*—Francis W. Young; Jack H. Hall

[57] ABSTRACT

A process for the production of high molecular weight, fiber- and film-trimming polyterephthaloyl oxalamidrazone and polydiphenylether-4,4'-dicarboxylic acid oxalamidrazone where a solution of pure terephtaloyl chloride or diphenyl-ether-4,4'-dicarboxylic acid dichloride in an inert solvent free from amines and water is slowly added, at a temperature between 10° C. and 35° C., to a solution of pure oxalic acid bisamidrazone in dimethyl acetamide and/or N-methyl pyrrolidone, free from amines and water, containing 4 to 6 percent by weight of anhydrous lithium chloride, the total quantity of the solvents used amounting to 1.25 to 3.30 liters per mole of oxalic acid bisamidrazone.

5 Claims, No Drawings

PROCESS FOR THE PREPARATION OF POLYTEREPHTHALOYL-AND POLYDIPHENYL ETHER-4,4-DICARBOXYLIC ACID OXALAMIDRAZONE

Polyterephthaloyl oxalamidrazone (PTO) and polydiphenyl ether-4,4'-dicarboxylic acid oxalamidrazone (PDDO) can be prepared either by the interface process as well as by the solution polycondensation process: M. Saga and T. Shono, Polymer Letters, Vol. 4, pp. 869–873 (1966) and Kogyo Kagaku Zasshi 69, pp. 2225–2228 (1966); U.S. Pat. Nos. 3,718,625; 3,544,528; and 3,876,586.

According to the solution polycondensation process described by Saga et el, oxalic acid bisamidrazone is dissolved in a solution of dimethyl formamide, N-methyl pyrrolidone, hexamethyl phosphoric acid triamide or dimethylacetamide and 5 wt.% lithium chloride and reacted under agitation at temperatures of 0° C. to 5° C. with solid terephthaloyl chloride. The resulting polymer solutions have a very low viscosity and therefore cannot be spun. By precipitating the polymers, one obtains products of an inherent viscosity of 0.2 to 0.76 (measured with 0.3 g./dl. $H_2SO_4$ at 30° C.), which corresponds to a reduced viscosity of max. 1.8 (measured with 1 g./dl. 5% KOH at 20° C.).

Once precipitated, the above products can only be dissolved in small amounts so that even in proceeding in this manner no spinning solutions of higher concentrations are obtainable. Whereas the products can be dissolved in alkali hydroxide solutions and subsequently molded by a wet process, e.g., in dilute sulfuric acid, (U.S. Pat. No. 3,719,681), the degree of polycondensation of the products is low and said products cannot be processed to serviceable fibers and films, either by a dry or a wet process.

The solution polycondensation process described in U.S. Pat. No. 3,544,528 also yields products of insufficiently reduced viscosity (e.g., $\eta_{red.}$) of from 2 to about 6.5). Moreover, this process does not lead to polymer solutions that can be dry-spun.

During the search for processes for the preparation of higher molecular weight polyacyloxalamidrazones, solution polycondensation processes were totally abandoned and interface polycondensation processes successfully further developed. According to the process described in U.S. Pat. Nos. 3,876,586; 3,718,625 polyterephthaloyl oxalamidrazones of a viscosity reduced to $\eta_{red.}=12$ are obtained. Products of this comparatively high degree of polycondensation (DP) have very good physical properties and can be processed to serviceable molded elements. However, with polyacyloxalamidrazones, the interface process has drawbacks of principle vis-a-vis the solution polycondensation process. The interface process requires the use of highly dilute solutions of the initial substances, e.g., solutions of 0.015 mole of the initial material per liter of solvent, so that the economics of the process are seriously impaired. The higher molecular weight polyacyloxalamidrazones are absolutely insoluble in organic solvents and therefore must be wet-molded by the above described method. A great many complex processing steps are required thereby, e.g., filtration and pressing of the highly swollen polymers, dissolving of the latter in alkali hydroxide, separation of the remaining organic phase followed by processing in the acid precipitation bath.

It has now surprisingly been found that by a special solution polycondensation process, polyterephthaloyl oxalamidrazone and polydiphenyl ether-4,4'-dicarboxylic acid oxalamidrazone of a still higher DP can be obtained.

The subject matter of the invention is a process for the preparation of polyterephthaloyl oxalamidrazone and polydiphenyl ether-4,4'-dicarboxylic acid oxalamidrazone by reaction of terephthaloyl chloride or diphenyl ether-4,4'-dicarboxylic acid dichloride with oxalic acid bisamidrazone by the solution polycondensation process in a reaction medium composed of an organic solvent and lithium chloride. The process is characterized by starting with a solution of pure oxalic acid bisamidrazone in amine-free and water-free dimethylacetamide and/or N-methylpyrrolidone, containing 4 to 6 wt.% water-free lithium chloride to which is slowly added, at a temperature of 10° to 35° C., a solution of pure acid chloride in an inert, amine-free and water-free solvent so that the total quantity of solvents represent 1.25 to 3.30 l. per mole of oxalic acid bisamidrazone.

A process characteristic inherent in obtaining a high degree of polycondensation is the use of amine-free and water-free dimethylacetamide or N-methylpyrrolidone as solvent of oxalic acid bisamidrazone. Mixtures of these two solvents can also be used. Other solvents than those cited do not, or only to a substantially lesser degree, have such a favorable effect on the progress of the solvent condensation.

Another essential characteristic of the process is that the solution polycondensation is carried out in a temperature range between 10° and 35° C. Use is preferably made of a polycondensation temperature between 18° to 30° C. At higher temperatures, there is a considerable decline in the degree of polycondensation. There is, moreover, the risk of gelling of the reaction product, whereby the entire reaction mix may be converted to a solid. Below 10° C., low MW products are obtained.

Another essential characteristic of the process is that acid chloride is dissolved in an inert, water-free organic solvent and then gradually added to the starting oxalic acid bisamidrazone solution. Suitable solvents for the oxalic acid bisamidrazone are in principle all organic liquids that are inert in the presence of acid chloride and which are miscible with dimethyl acetamide, N-methylpyrrolidone or a mixture of both solvents. Eminently suitable are the solvents dimethylacetamide and N-methylpyrrolidone, i.e., the same solvents that are used to dissolve the oxalic acid bisamidrazone. Other suitable solvents are benzene, toluene, ethylurethane, carbon tetrachloride, methylene chloride and xylene. This characteristic of the process, i.e., dissolution of the acid chloride in a solvent compatible with the solvent for oxalic acid bisamidrazone, makes possible a favorably constant temperature within the very narrow temperature range, as well as a favorable heat and material exchange, which is especially significant at the high material concentrations and high viscosity of the reaction mix. The risk of gelling of the reaction mix is thus avoided. The preferred solvents for acid chloride are dimethylacetamide, N-methylpyrrolidone, benzene, toluene, xylene and methylene chloride.

A very decisive factor in the degree of polycondensation of polyacyloxalamidrazones and hence in a successful performance of the process of the invention is maintaining the indicated total amount of solvents, being 1.25 to 3.30 liters per mole oxalic acid bisamidrazone. In the case of polyterephthaloyl oxalamidrazone, the total amount of solvents is preferably 2.50 to 3.30 liters per mole, especially 2.50 to 3.00 liters per mole; in the case of polydiphenylether-4,4'-dicarboxylic acid oxalamidrazone, perferably 1.25 to 2.00 liters per mole, especially 1.40 to 1.70 liters per mole. The degree of polycondensation increases as the total amount of solvents is reduced, under otherwise unchanged process conditions. However, one should not use less than the indicated amounts of solvents since a reaction mix of higher concentration will result in polymer solutions of very high viscosity, which are either very difficult or impossible to process. Some 15 to 40% of the total amount of solvent is used to dissolve the acid chloride.

Furthermore, the purity of the starting materials has a decisive effect on the degree of polycondensation. The acid chlorides and oxalic acid bisamidrazone should not be contaminated by any reaction products or products of consecutive reactions. For purification of acid chloride, a two-stage fractionated distillation is advisable, in the case of terephthaloyl chloride at about 20 mbar, in the case of diphenyl ether-4,4'-dicarboxylic acid dichloride at a high vacuum. Oxalic acid bisamidrazone should be purified immediately after its preparation, since the desired degree of purity can be obtained after prolonged storage only with considerable effort or not at all. Oxalic acid bisamidrazone of adequate purity is obtained, e.g., by recrystallization at 80° C. from hot dimethylformamide under nitrogen, followed by washing with methanol. The starting material must, of course, also be free from water.

Essential to the process is also the purity of the reaction medium. Both lithium chloride and the organic solvents must be used in a water-free form, in which the water content does not exceed 0.01%. Moreover, the solvents should also be free from amines. Industrial grade solvents contain as a rule more or less amine; it is therefore essential that they be subjected to very careful purification. Water and amines are removed from the solvents by conventional processes. For example, water- and amine-free dimethylacetamide can be obtained by boiling with small amounts of methylene diphenyl diisocyanate followed by vacuum distillation. With N-methylpyrrolidone, the majority of free amine must first be removed by azeotropic distillation with water/benzene. Water and amine can also be readily removed from both solvents by passing them through a column packed with molecular sieves of 5° to 10° A. The amine content of a solvent is easily determined with trinitrotoluene. The solvents used in the process of the invention should have no amine reaction with trinitrotoluene, indicated by a purple discoloration. Reference is made in this connection to relevant laboratory handbooks.

The process of the invention is expediently carried out by first dissolving lithium chloride in the organic solvent, followed by dissolving oxalic acid bisamidrazone in this mix, cooling the solution to the desired reaction temperature, and then gradually stirring in a solution of the acid chloride. The reactants are used in stoichiometric quantities, i.e., in equimolar quantities. A slight excess of one or the other component has no deleterious effect on the polycondensation.

The addition of acid chloride should proceed over a period of 30 to 80 minutes. Once the addition of acid chloride is completed, the reaction mix is stirred for another 5 to 20 hours at the given temperatures. The polymers can be recovered from the solutions obtained in this manner by evaporation of the solvent or by precipitation with a suitable precipitation liquid, such as water, followed by molding according to the well-known wet process by dissolving in an alkali hydroxide and subsequent precipitation in an acid medium.

It is, however, much more advantageous in manufacturing the molded elements of polyacyloxalamidrazone, to filter the viscous solutions obtained according to the invention, e.g., by using one of the conventional filter presses, followed by vacuum deaeration and then by wet or dry molding, e.g., by spinning fibers or extruding films.

In wet-molding of the polyacyloxalamidrazone solutions obtainable according to the invention, it is expedient, because of the high absolute viscosity of the polymer solutions and the danger of gel formation, to do the molding with solutions of a polymer concentration of 0.33 to 0.35 mole/liter solution. Water is most suited as the precipitant. To neutralize the acid formed during polycondensation, good results were obtained by the addition of sodium acetate, sodium phosphate or of another acid acceptor; however, such addition is not necessary. Spinning tests yielded filaments of favorable tenacity, e.g., in excess of 25 cN/tex at 20% elongation.

It is, however, best to process the viscous polymer solutions directly to fibers and films by the dry-spinning process. Consequently, a further subject matter of the invention is the use of the polymer solutions obtainable by the process of the invention for the production of fibers and films by the dry-spinning process. Conventional, dry-spinning equipment can be used for this. The chimney temperatures range between 160° to 220° C., spinning pressures are from 5 to 15 bar and draw-off rates are between 80 and 100 m./min. Very good fibers can also be obtained by this process. Hot drawing may be applied to increase the tenacity.

The process of the invention offers substantial advantages over known processes. First of all, it makes possible the preparation of polyacyloxalamidrazones, having a high degree of polycondensation via a solution polycondensation process, which are spinnable, whereas low viscosity solutions obtained according to known solution polycondensation processes, produce dripping from the spinneret and cannot be spun. Products having an adequately high degree of polycondensation have not been heretofore obtained by these known processes. By contrast, the process of the invention leads to polyacyloxalamidrazones distinguished by a high degree of polycondensation, which can be made into fibers of exceptional textile characteristics, particularly high residual strengths after UV exposure, and into very good films. Because of the high degree of polycondensation of the polymers, the reaction solutions can be molded directly.

Compared with known interface polycondensation methods, the process of the invention has the advantages previously mentioned. Apart from the fact that a solution polycondensation process is less complex in terms of equipment and less labor-intensive, products of substantially higher molecular weight are obtained, e.g., polyacyloxalamidrazones of a reduced viscosity ranging between 15 and 23.

It should be considered remarkable that according to the invention it is possible to obtain by a solution polycondensation process products exhibiting such superior characteristics. It could not be anticipated that the reaction temperature, the use of oxalic acid bisamidrazone, the selection, the nature and the quantity of the solvent and the high purity of the starting materials would have such a decisive influence on the polycondensation and on the degree of polycondensation of the resulting products. It was especially astonishing that the comparatively high molecular weight polyacyloxalamidrazones stay in the reaction solution, making it possible for the first time to process polyacyloxalamidrazones by a solution polycondensation method.

EXAMPLE 1

Ten grams dried LiCl and 8.12 g. (70 mmole) oxalic acid bisamidrazone were dissolved consecutively in 140 ml. amine-free and water-free dimethylacetamide at room temperature. 14.22 g. (70 mmole) terephthaloyl chloride, dissovled in 60 ml. dimethylacetamide, were stirred under cooling into this solution over a period of 30 minutes. The reaction temperature was maintained within a range of 20° to 24° C. After stirring for 18 hours at room temperature, the yellow viscous solution was precipitated in 1 liter water to which 11.76 g (140 mmole) NaHCO$_3$ had been added to neutralize the formed hydrochloric acid. The resulting polyterephthaloyloxalamidrazone was washed three times with water, then with methanol, followed by vacuum drying at 60° C. Yield=98%. The reduced viscosity of the polymer was $\eta_{red.}$=22.8 (1 g./dl. 3% KOH at 20° C.).

EXAMPLE 2

Sixty grams (60 g.) dried lithium chloride and 52.9 g. (0.456 mole) oxalic acid bisamidrazone were stirred consecutively and dissolved under nitrogen in 800 ml. dimethylacetamide at room temperature. 92.6 g. (0.456 mole) terephthalic acid dichloride dissolved in 400 ml. dimethylacetamide were added to the solution under intensive stirring with an "anchor" stirrer within a period of 80 minutes. The reaction temperature was maintained within a range of 20° to 25° C. After stirring for 18 hours at room temperature, the viscous solution of the polycondensate was passed through a pressure filter and vacuum-deaerated.

The solution containing 8.7% polyterephthaloyl oxalamidrazone had a viscosity of 2530 sec. BF, a dynamic viscosity of 578 Pa.s. The reduced viscosity of the polymer was $\eta_{red.}$=15.5 (1 g./dl. 3% KOH at 20° C.).

The solution was spun to filaments on a dry-spinning apparatus having a chimney temperature of 180° to 200° C., a spinning pressure of 8 bar, an air pressure of 10.7 mbar and a draw-off speed of 100 m./min. A spinneret with 15 orifices, each of 0.25 mm., was used.

Finally, the filaments were washed for several hours with demineralized water and dried in a circulating air drier at 70° C. The resulting fibers had a denier of 135 dtex, a tenacity of 17 cN/tex and a dry elongation of 3%.

EXAMPLE 3

Sixty (60) g. dried lithium chloride and 83.5 g. (0.72 mole) oxalic acid bisamidrazone were added consecutively, at room temperature, to 800 ml. dimethylacetamide and dissolved by stirring under nitrogen. To this solution, 212.4 g. (0.72 mole) diphenylether-4,4'-dicarboxylic acid chloride dissolved in 400 ml. dimethylacetamide were added under intensive mixing with an "anchor" stirrer within 60 minutes. The reaction temperature was maintained within a range of 20° to 25° C. After stirring for 15 hours at room temperature, the viscous polycondensate solution was filtered through a pressure filter and vacuum-deaerated.

The reduced viscosity of the polymer was $\eta_{red.}$=3.2 (1. g./dl. HCOOH at 20° C.). The spinning solution had a polymer content of 15.3%, a ball fall time of 5040 sec., a dynamic viscosity of 6.14 Pa.s.

The solution was spun using a dry spinning apparatus having a chimney temperature of 180° to 200° C., a spinning pressure of 19 bar, at an air pressure of 10.7 mbar and a draw-off speed of 100 m./min. A spinneret of 15 orifices, each of 0.25 mm., was used.

The filaments were pressure-washed on the spool for several hours with demineralized water and subsequently dried at 80° C. in a circulating air drier.

The resulting filaments had a denier of 209 dtex, a tenacity of 13 cN/tex, and a elongation of 64%.

When the filaments were be hot-drawn at 190° C. and a draw-ratio of 1:1.9, an increase in tenacity in excess of 200% was obtained.

EXAMPLES 4 TO 6

As described in Example 2, a polyterephthaloyl oxalamidrazone (PTO) solution in dimethylacetamide/lithium chloride was prepared. This solution was subsequently wet-spun in combination with drawing, making use of two precipitation baths.

The following table lists the viscosity of the polyterephthaloyl oxalamidrazone (PTO) solution, its solid content, the composition of the precipitation baths, the precipitation temperature, draw-off speed, drawing data as well as tenacity and elongation data of the resulting fibers.

| Example No. | 4 | 5 | 6 |
|---|---|---|---|
| Reduced viscosity of PTO | 17.3 | 17.3 | 12.1 |
| Ball fall time of the PTO solution in sec. | 222 | 222 | 135 |
| Solid content of the PTO solution in wt. % | 7.4 | 7.4 | 7.4 |
| Spinneret (No. of orifices/orifice dia. in mm.) | 60/0.06 | 60/0.06 | 60/0.06 |
| First precipitation bath | 2.5% aqueous Sodium acetate, 25° C. | Water, 25° C. | Water, 25° C. |
| Second precipitation bath | H$_2$O, 20° C. | | |
| Draw-off speed in m./min. | 25 | 23.3 | 25 |
| Drawing in % | 16 | 5 | 0 |
| Dry tenacity in cN/tex | 27 | 25.8 | 24 |
| Dry elongation in % | 19.4 | 24 | 29.5 |
| Wet tenacity in cN/tex | 13.3 | 13 | 11.3 |
| Wet elongation in % | 20.6 | 26.7 | 31 |

What is claimed is:

1. A process for the preparation of polyterephthaloyl- and polydiphenylether-4,4'-dicarboxylic acid oxalamidrazone by reaction of terephthaloyl chloride or diphenylether-4,4'-dicarboxylic acid dichloride with oxalic acid bisamidrazone by the solution polycondensation process in a reaction medium consisting of an organic solvent and lithium chloride, characterized in that use is made of a solution of pure oxalic acid bisamidrazone in amine-free and water-free dimethylacetamide or N-methylpyrrolidone or a mixture thereof, containing 4 to 6 wt.% water-free lithium chloride to which is slowly added at temperatures of 10° to 35° C., a solution of the pure acid chloride in an inert, amine-free and water-free solvent, with the provision that the total quantity of solvents represent 1.25 to 3.30 liters per mole of oxalic acid bisamidrazone.

2. The process according to claim 1, wherein the polycondensation is carried out at 18° to 30° C.

3. The process according to claim 2, wherein the solvent for acid chloride is selected from the group consisting of dimethylacetamide, N-methylpyrrolidone, benzene, toluene, xylene and methylene chloride.

4. The process according to claim 3, wherein polyterephthaloyl oxalamidrazone is prepared by the reaction of terephthaloyl chloride and the total amount of solvents is from 2.5 to 3.3 liters per mole of oxalic acid bisamidrazone.

5. A process for making fibers and films comprising dry spinning a solution of polyterephtaloyl- and polydiphenylether-4,4'-dicarboxylic acid oxalamidrazone, said oxalamidrazone being prepared by the process of claim 3.

* * * * *

UNITED STATES PATENT OFFICE
CERTIFICATE OF CORRECTION

Patent No. 4,208,509          Dated June 17, 1980

Inventor(s) Michael Wallrabenstein, Joachim Behnke and Walter Brodowski

It is certified that error appears in the above-identified patent and that said Letters Patent are hereby corrected as shown below:

In line 2 of the Abstract delete "trimming" and insert therefor --forming--.

Signed and Sealed this

Second Day of September 1980

[SEAL]

Attest:

SIDNEY A. DIAMOND

Attesting Officer     Commissioner of Patents and Trademarks